UNITED STATES PATENT OFFICE.

GIAN ALBERTO BLANC AND FELIX JOURDAN, OF ROME, ITALY.

TREATMENT OF LEUCITIC ROCKS FOR THE PURPOSE OF RENDERING POTASSIUM COMPOUNDS AVAILABLE.

1,418,356.     Specification of Letters Patent.     Patented June 6, 1922.

No Drawing.     Application filed October 21, 1920. Serial No. 418,579.

*To all whom it may concern:*

Be it known that we, Dr. GIAN ALBERTO BLANC, a subject of the King of Italy, and FELIX JOURDAN, a citizen of the French Republic, both residing at Rome, in the Kingdom of Italy, have invented certain new and useful Improvements in the Treatment of Leucitic Rocks for the Purpose of Rendering Potassium Compounds Available, (for which I have filed application in Italy Oct. 6, 1919), of which the following is a specification.

Many distinct methods have hitherto been proposed all pursuing the aim of rendering available the potash contained in the leucitic rocks. Substantially the fact has been taken advantage of that in the leucite the potassium is bound to the silicic acid in a combination which is not very stable, so that by attacking it with a strong acid, the silicic acid can be separated.

Particularly when acting on the mineral, previously broken into minute fragments, or, better ground to powder, with hydrochloric acid, the separation of the potassium is complete. In practice when great masses of materials are to be treated the above said methods suffer all the drawback of the high cost of the chemicals to be used, which cost cannot, as a general rule, be reduced by utilizing the by-products for which it is difficult to find a ready market.

According to our present invention the above said difficulties are obviated by reducing the cost of the raw materials to be used and by eliminating all useless by-products, this result being obtained by taking advantage of a certain peculiar behaviour of the leucite, toward weak mineral acids or even organic acids.

As has been mentioned above the leucite yields its potassium contents to the strong acids, and, when it is broken and ground into powder it may be wholly divested of its potassium. This result cannot however be obtained by means of weak mineral acids or with organic acids, which do not succeed in attacking materially the leucite not even if it is triturated and ground in the ordinary way.

If however the grinding process is pushed so far as to reduce the mineral into an almost impalpable powder, a radical change appears in the behaviour of the mineral under the action of the acids. Experiments have shown that leucite, when reduced to a very fine and almost impalpable powder, is attacked completely by the organic acids, such as citric, acetic, formic, oxalic and like acids, and also by weak inorganic acids, including carbonic acid, these acids replacing the silicic acid and saturating completely the potassium.

The attack of the mineral is facilitated and shortened by the elevation of the temperature and by a convenient pressure accompanied by a continual agitation.

The fact that the mineral reduced to impalpable powder can be attacked by the weak organic acids and even by carbonic acid, shows, above all, that, in such a state, the mineral can be directly utilized as a potassic fertilizer in the soil to which it slowly yields the potash it contains.

Treated with carbonic anhydrid under convenient conditions, of temperature and pressure, it may yield all its potassium in the shape of carbonate and, if the treatment is not pushed to complete exhaustion, the remnant material can be still utilized as a potassic fertilizer.

In practising the invention, after having separated the leucite from the rock containing same, it is advantageous to begin with a calcination of the mineral, by means of which the instability of the combination of the potassium with the silicic acid is increased.

The presence of steam, superheated to 400°–500° C. either alone, or in union with quick lime, magnesia, and the like, enhances the action which the temperature would produce, helped when necessary, by an elevation of the pressure also: It is of course convenient that the material be broken and ground.

The material, after having been thus dealt with and ground to the prescribed fineness, is introduced into an autoclave and therein treated with carbonic anhyrid under pressure and by raising the temperature.

The agitation facilitates and shortens the time of the reaction during which the potassium silicate is transformed into potassium carbonate. The transformation is complete if the reaction is sustained for a sufficiently long time, and then the potassium carbonate can be separated by means of a simple lixiviation.

When the transformation is not complete, after having extracted the carbonate of potassium, the residual material which still contains a considerable quantity of silicate of potassium, may be utilized as a fertilizer, since, as before mentioned, the mineral being reduced to an impalpable powder, the silicate contained therein, is slowly decomposed by the organic acids present in the soil.

We claim as our invention:

1. Process for making directly available the potash contained in leucitic rocks which consists in calcinating the leucite, reducing it to an impalpable powder, and then treating it with an organic acid.

2. The process as specified in claim 1, in which the leucite is submitted to calcination in the presence of superheated steam and an oxide of an alkaline-earth metal.

In testimony whereof they affix their signatures in presence of two witnesses.

GIAN ALBERTO BLANC.
FELIX JOURDAN.

Witnesses:
RUGGERO SCHIFF GIORINI,
LELLEN LABRONELBE,